May 9, 1939.  H. A. MANTZ  2,157,296
CONTROL DEVICE
Filed July 1, 1931   2 Sheets-Sheet 1

Inventor:
Harold A. Mantz
By Brown, Jackson, Boettcher & Dienner
Attys.

May 9, 1939.  H. A. MANTZ  2,157,296
CONTROL DEVICE
Filed July 1, 1931   2 Sheets-Sheet 2
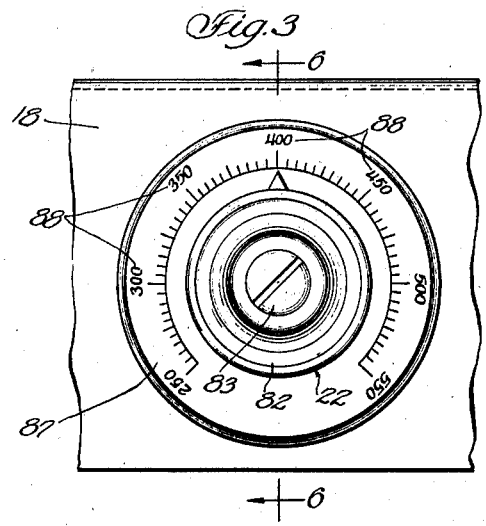
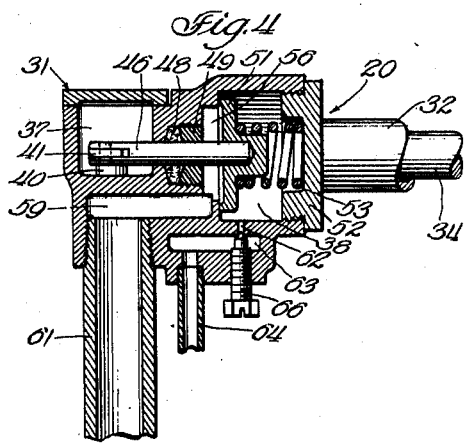
Inventor:
Harold A. Mantz
By Brown, Jackson, Boettcher & Dienner
Attys.

Patented May 9, 1939

2,157,296

UNITED STATES PATENT OFFICE 2,157,296

CONTROL DEVICE

Harold A. Mantz, Milwaukee, Wis., assignor to Milwaukee Gas Specialty Company, Milwaukee, Wis., a corporation of Wisconsin Application July 1, 1931, Serial No. 548,090

5 Claims. (Cl. 236—15)

This invention relates, broadly, to temperature control devices, and more particularly to temperature control devices adapted for use in connection with ovens and the like, although it is not to be limited to use in this respect.

I have considered the problem of controlling the temperature of oven, space heaters and the like and have observed that the installation of such devices usually entails making unsightly openings in the walls of the oven or enclosure and necessitates the use of pipes, control devices and the like outside of the oven where they interfere with operation of the stove and the oven and present an unsightly appearance. The devices are usually complicated and expensive to install and maintain.

I have conceived of a temperature regulating device which need not project outside the oven above the stove nor need it project in the space in front of the oven. It is readily installed and maintained. The device is simple, reliable and inexpensive.

It is, therefore, a general object of my invention to provide a convenient, inexpensive, easily installed, dependable temperature regulating and control mechanism.

More particularly it is an object of the present invention to provide a temperature control device comprising a thermostat, a fuel feed control mechanism operatively connected to the thermostat, a regulating means spaced at a distance from the feed control mechanism, and an operative connection between the regulating means and the feed control mechanism.

Another object of the invention is to provide in a device sensitive to changes in temperature of an oven or the like, a fuel flow control means located in the vicinity of temperature sensitive device, a mechanism for controlling the fuel flow control means operatively connected to the temperature sensitive device, and a regulating mechanism spaced at a distance from the fuel flow control mechanism, whereby control of the temperature of the oven may be effected at a distance therefrom.

Another important object of the invention is to provide a device in which the connection between the temperature responsive device and the regulating mechanism may be carried around corners or other obstructions or located in irregular channels.

Another object of the invention is to provide a device which may be hidden from view and which will not interfere with the operation and use of the stove, oven or other heating device.

Another object of the invention is to provide, in a system of the above character, a thermostat and valve structure which is hidden away in the oven but which may be regulated by a control mechanism located at a distance therefrom.

A further object of the invention is to provide a device of the character described which shall be reliable and inexpensive to operate and maintain, which may be readily and quickly installed and removed.

The foregoing and other objects of the invention, together with their attendant advantages, will be apparent as the invention becomes better understood by reference to the accompanying specification and drawings forming a part thereof, it being premised that changes may be made in the various details and the manner of operation within the scope of the appended claims without departing from the spirit and scope of the invention.

In the drawings:

Figure 3 is an enlarged view in front elevation of the remotely disposed regulating device, shown in Figure 1 as located in front of the stove portion of the range;

Figure 4 is a view in vertical section of the device shown in Figure 2 and taken substantially along the line 4—4 thereof;

Figure 1:
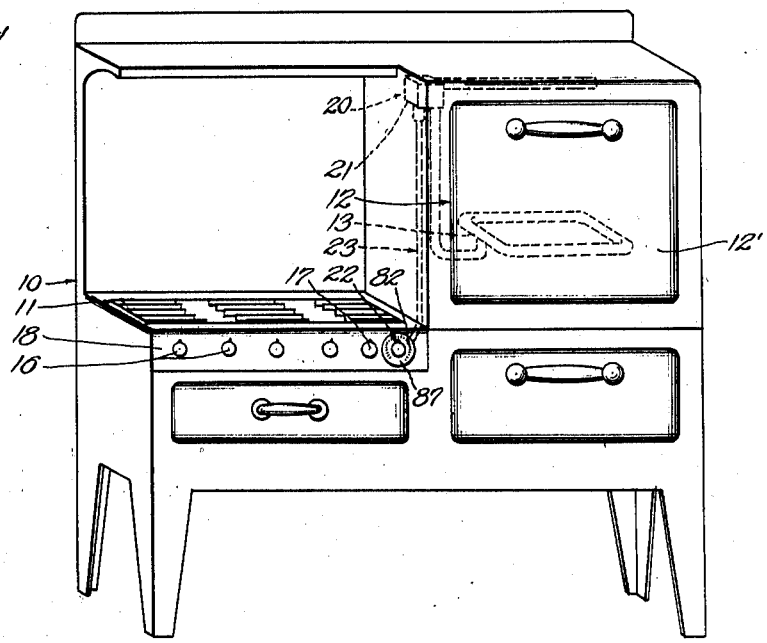
Figure 1 is a view in perspective of a gas range to which an oven temperature regulator is applied in accordance with my invention.
Figure 2:
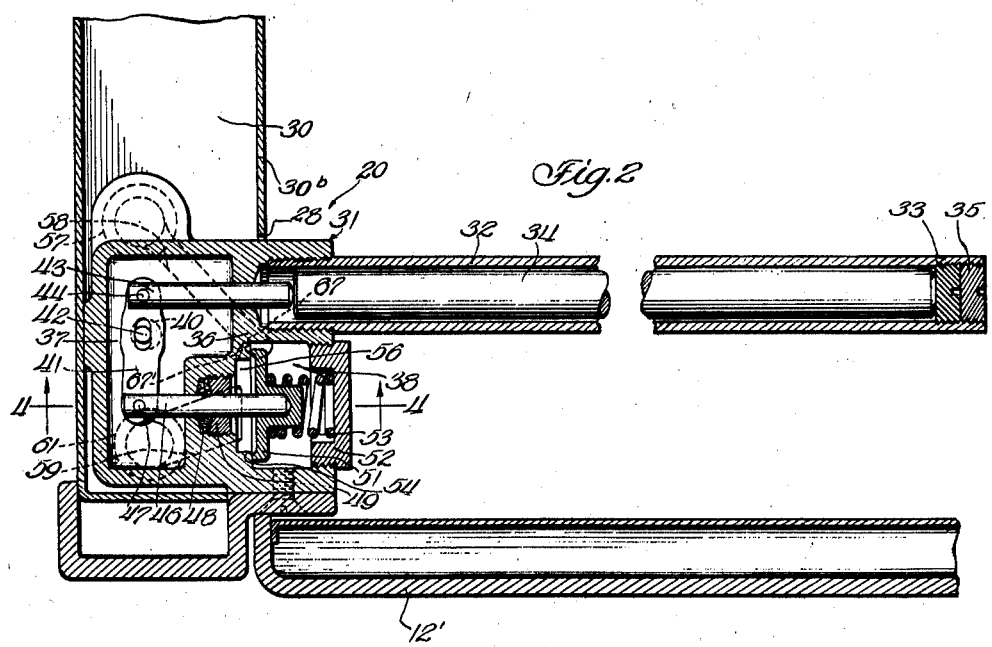
Figure 2 is a view in horizontal section of the fuel flow control mechanism shown in dotted lines in Figure 1.

Figure 5 is a side elevational view of the control device shown in Figures 2 and 4. The figure also shows a portion of the connecting device utilized between the fuel flow control mechanism and the regulating device; and Figure 6 is a view in vertical section of the regulating device shown in Figures 1 and 3 and taken on the line 6—6 of Figure 3.

Referring now to the drawings for a more complete disclosure of a control system embodying my invention and particularly to Figures 1, 3 and 6 there is shown at 10, generally a gas stove or range in which a portion 11 of the range is utilized for burners of the open type and another portion of the range is used for an oven 12 in which one or more oven burners 13 are located. On constructing the range the oven may be placed at the right hand or left hand end thereof, as desired. The oven door is indicated at 12'.

The range or other heating device may be of any desired style. In the present instance, however, I have illustrated my invention as applied to the "cabinet" type of range in which the control valves 16 for the top burners of the stove and the valve 17 for the oven burner are located or mounted upon a panel 18 at the front of the stove in order that the valves, mixing chambers and piping may be covered and concealed or substantially concealed from view from the front of the range.

My control device is comprised essentially of three parts, a fuel flow control structure 20, a selecting or regulating device 22 located at a distance from the fuel flow control device, and a motion transmitting mechanism 23 for connecting the devices.

The fuel flow control structure 20, including the thermostat 21, is preferably located within the oven. It may be located at any desirable position within the oven, but I prefer to provide an opening 29 in the inner wall 30b of the oven, at the side adjacent the stove portion of the range, locating the body of the structure within the walls, and permitting the thermostat or other temperature sensitive device to project into the oven beneath the top thereof. By mounting the device in this position it is out of the way and does not interfere with the use of the oven. In addition the thermostat is thereby located in a position where it most truly reflects the oven temperature.

The most convenient location for the selecting or regulating device 22, from the standpoint of utility of operation, is in a position on the panel 18. It is very desirable, particularly if enameled sheet material is used for the stove construction, that no openings be made in the outer wall of the oven. If the parts of the heat control device project outside of the oven above the stove, they are not only unsightly but interfere with the operation of the range.

I have therefore conceived of a temperature control device which utilizes a flexible connection between the fuel flow control means and the regulating mechanism, which may be led around corners and which is therefore well adapted to be located within the wall of the oven above the level of the stove, but which may be led out of the oven wall at a point below the level of the top of the stove and to the selecting or regulating mechanism 22.

The temperature responsive element, the fluid flow control means, the connecting mechanism, and the regulating device are especially constructed in order that the system will transfer the regulating movements of the regulating device to the fuel flow control device to properly regulate the gas flow to the oven burner in accordance with the temperature of the oven.

The fuel flow control valve and valve operating mechanism are enclosed within a rectangular housing or body 31, which, as previously stated, is set within a suitable recess in the wall 30 of the oven. The valve housing is disposed in the upper portion of the oven and a tube 32 is threaded into the housing to extend into the oven adjacent the upper wall thereof. Two plugs are threaded into the outer end of the tube, one of which, 33, is an adjusting screw for moving the rod 34, which is disposed within the tube 32, back and forth, and the other, 35, is a locking screw for locking the screw 33 in place. The coefficient of expansion of the tube 32 is greater than that of the rod 34 and therefore on heating, the tube expands in a direction axially or longitudinally of the tube to a greater extent than the axial or longitudinal expansion of the rod.

The housing 31 is provided with a dividing wall 36 which divides the interior of the housing into two chambers 37 and 38. The chamber 37 serves as a housing for the valve operating mechanism which includes a slotted lever 41 which is pivotally mounted upon the end of an eccentric 42. A push rod 43 is pivotally engaged upon one end of the lever 41 as by means of the pin 44 and the rod passes through the wall 36 and rests against the end of the thermostatic element 34. A second rod 46 is pivotally engaged upon the other end of the lever 41 as by means of the pin 47 and also extends through the wall 36 and into the chamber 38. The lengths of the lever arm 41 between the various pins may be so chosen that the relative movement between the rod 34 and the tube 32 may be magnified or diminished as desired. In the illustrated embodiment the greater length of arm 41 between the pin 42 and the pin 47 than between the pin 42 and the pin 44 magnifies the relative movement between the rod 34 and the tube 32 and produces relatively great movement of the rod 46 with relatively slight relative movement between rod 34 and tube 32.

The joint between the rod 46 and the wall 36 is sealed as by means of the packing 48 and the packing nut 49. The valve 51 is of the "mushroom" type and is disposed on the free end of the rod 46 to permit reciprocation of the valve within the chamber 38. A plug 52 is threaded into the end of the chamber 38 and affords a mounting for the spring 53 which is so arranged as to bias the valve 51 to a closed position if the position of the rod 46 is such as to permit it to do so. A ledge 54 on the wall 36 affords a seat for the valve 51 so as to permit the valve to close off the passageway from the chamber 38 on one side of the valve to the chamber 56, which is located on the opposite side of the valve.

Gas from the conduit or intake manifold 57 (Fig. 5), which is connected to the main manifold (not shown), passes through a channel 58 within the housing 31 into the chamber. If the valve is open, gas flows into the chamber 56 and out through the channel 59 into the conduit 61 and from there to the burner 13.

A small bore 62 leading through the bottom wall of the chamber 38 permits gas to flow from the chamber into a channel 63 and into a conduit 64 which leads to the pilot burner (not shown) which furnishes ignition for the heater or main burner. The quantity of fuel flowing per unit of time may be regulated by means of a needle valve 66. A second needle valve 67 is adapted to control a by-pass opening 67' (Fig. 2 between the chamber 38 and the chamber 56 to permit the passage of gas into the burner in sufficient quantity to maintain a flame at the burner at all times.

It may readily be understood that if the valve 51 is in an open position, gas will flow into the burner, but that as the oven heats up, thereby heating the tube 32, the tube will expand and the spring 53 will bias the valve toward a closed position by moving the link 46 inwardly to push the link 43 outwardly against the rod 34.

The pin 42 is eccentrically located with regard to a shaft 40, which is mounted for rotation within a bushing 72 which is a part of the housing 31. A flexible shaft 68 is secured to the shaft 40 at its lower end and the flexible shaft 68 is housed within a flexible conduit 69. A collar 70 is fastened over the upper end of the conduit 69 and the collar is engaged to the housing 31 by means of a nut 71 which engages a suitable flange on the collar and is threaded on the projection 72 of the housing.

The other or lower end of the conduit 69 is fastened within a suitably flanged collar 73 in any desired manner. A bushing 74 is passed through the panel 18 and is secured in place by means of a nut 76 which is threaded on the bushing and engages the back wall of the panel. A collar 77 engages the collar 73 on conduit 69 and is threaded on the bushing 74 to hold the lower end of the conduit 69 in place with respect to the panel 18. A shaft 78 is journaled for rotation within the bushing 74 and is provided with a suitable axial opening 79 for engaging a hollow shaft 81 which in turn is engaged upon the flexible shaft 68. The shaft 78 extends entirely through the panel 18 and for a space in front of the panel and a control knob 82 is secured to the end of the shaft 78, as by means of a screw 83. A pointer 84 is held in fixed relation beneath the control knob 82, between the knob and a washer 86 which engages a suitable flange on the shaft 78. A dial 87 is located on the panel 18 below the pointer 84 and the dial is provided with indicia 88 to indicate the temperature at which it is desired to maintain the oven or other enclosed space.

In operation of the fuel control means fuel is admitted to the inlet manifold 57 from the manifold (not shown) which conducts fuel to the top burners of the stove, by opening the valve 17. The control knob 82 is then rotated from a closed position to one such that the pointer 84 indicates on the dial 87 the temperature at which it is desired to keep the oven. The movement of rotation of the knob 82 causes rotation of the flexible shaft 68 in the same direction, thereby causing rotation of the shaft 40 and outward movement, or movement to the right, of the pivot 42 and lever 41 because of the eccentricity of the pivot 42 with respect to the shaft 40. The rotation of the eccentric 42 of the shaft 40 increases or decreases the effective overall length of the train of push rods including rods 34, 43 and 46. If the effective length is increased the valve 51 is raised to a greater extent and the oven will reach a comparatively high temperature before the tube 32 expands sufficiently to cause the valve 51 to have material or the desired movement toward its seat. If the effective length is decreased the expansion of the tube 32 on heating of the oven will cause the valve 51 to have the desired movement toward its seat at a lower oven temperature. Of course, in all cases a point of equilibrium is reached such that the area of the opening of the valve is just sufficient to furnish enough gas to maintain the temperature of the oven at a constant value. If the plug 33 is properly adjusted within the tube 32 the temperature of the oven will closely correspond with the temperature indicated by the pointer 84 on the dial 87.

It may readily be understood that I have provided a convenient, inexpensive, easily installed, dependable temperature regulating and control mechanism in which the working parts are hidden from view and do not interfere with operation of the oven and stove.

Having thus described my invention, I claim:

1. In a temperature control device, a heater burner, a conduit for furnishing fuel to the burner, a valve in the conduit for regulating the flow of fuel to the burner, a valve operating mechanism including a thermostat, means for regulating the effective action of the valve operating mechanism including an eccentrically mounted pivot, and a flexible cable connected to and rotatable by said regulating means for moving said pivot.

2. In a temperature control device, a heater burner, a conduit for furnishing fuel to the burner, a valve in the conduit for regulating the flow of fuel to the burner, a valve operating mechanism including a thermostat, a train of push rods, a lever for changing the action of the push rods, an eccentric upon which the lever pivots, and means for regulating the position of the eccentric from a distance comprising a control knob and a flexible cable rotatable thereby and connected to said eccentric.

3. In a temperature control mechanism for a gas stove, a burner, a valve for regulating the flow of fuel to the burner having the valve body located within the wall of the oven, a thermostat secured to the body of the valve, a valve operating mechanism including a pivoted lever located within the body operatively connected to the valve and the thermostat, and eccentric pivot for said lever for regulating the effective overall length of the valve operating mechanism, a control knob located at a distance from the eccentric, and a flexible cable rotatably connected between the control knob and the eccentric.

4. In a temperature control device, a heater burner, a conduit for furnishing fuel to the burner, a valve in said conduit, a pivoted valve operating mechanism including a thermostat, flexible rotatable means for adjusting the point of pivoting of said mechanism, and selecting means disposed in a location remote from the valve for actuating said adjusting means to secure different maintained temperatures of the heated space.

5. In a temperature control device, the combination of a valve, pivoted lever means cooperating with said valve, a thermally sensitive member for rocking said lever means about its pivot to actuate said valve in response to temperature changes, selecting means, and flexible rotatable means for shifting the point of pivoting of said lever means in response to rotation of said selecting means.

HAROLD A. MANTZ.